United States Patent
Park et al.

(10) Patent No.: US 11,926,692 B2
(45) Date of Patent: Mar. 12, 2024

(54) TRANSITION METAL COMPOUND FOR A CATALYST FOR OLEFIN POLYMERIZATION AND CATALYST FOR OLEFIN POLYMERIZATION COMPRISING THE SAME

(71) Applicant: HANWHA SOLUTIONS CORPORAION, Seoul (KR)

(72) Inventors: SeongYeon Park, Daejeon (KR); Wook Jeong, Daejeon (KR); Lanhua Piao, Daejeon (KR); HyunSeung Lee, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 502 days.

(21) Appl. No.: 17/292,702

(22) PCT Filed: Nov. 11, 2019

(86) PCT No.: PCT/KR2019/015217
§ 371 (c)(1),
(2) Date: May 10, 2021

(87) PCT Pub. No.: WO2020/105922
PCT Pub. Date: May 28, 2020

(65) Prior Publication Data
US 2022/0010039 A1    Jan. 13, 2022

(30) Foreign Application Priority Data
Nov. 20, 2018 (KR) .................. 10-2018-0143289

(51) Int. Cl.
| | | |
|---|---|---|
| *C07F 17/00* | (2006.01) | |
| *C08F 4/659* | (2006.01) | |
| *C08F 4/6592* | (2006.01) | |
| *C08F 210/16* | (2006.01) | |

(52) U.S. Cl.
CPC ...... *C08F 4/65922* (2013.01); *C08F 4/65912* (2013.01); *C08F 4/65916* (2013.01); *C08F 4/65925* (2013.01); *C08F 210/16* (2013.01); *C08F 2420/07* (2021.01)

(58) Field of Classification Search
CPC ..... C07F 17/00; C08F 4/65925; C08F 210/16
See application file for complete search history.

(56) References Cited

U.S. PATENT DOCUMENTS

| | | |
|---|---|---|
| 5,747,405 A | 5/1998 | Little |
| 2004/0152591 A1 | 8/2004 | Jin |

FOREIGN PATENT DOCUMENTS

| | | |
|---|---|---|
| WO | 2018151790 A1 | 8/2018 |

OTHER PUBLICATIONS

Licht, A.I., et al., Journal of Organometallic Chemistry, Elsevier, vol. 684, No. 1-2, Nov. 2003, pp. 91-104.
European Search Report(EESR) dated Jun. 17, 2022.
Qian, Y. et. al, "New substituted titanocene, zirconocene and hafnocene dichlorides," Transition Metal Chemistry, 1996, vol. 21, No. 5, pp. 393-397.
Spence, R. E. V. H. et al, "One-Component Group 4 Homogeneous Ziegler-Natta Olefin Polymerization Catalysts: Hydroboration of Zirconium Bisalkyls with Pendant 2-Propenyl Groups Using [(C6F5)2BH]2," Organometallics, 1995, vol. 14, No. 10, pp. 4617-4624.
International Search report dated Feb. 27, 2020.

*Primary Examiner* — Caixia Lu
(74) *Attorney, Agent, or Firm* — Harvest IP Law, LLP

(57) ABSTRACT

The present invention relates to a transition metal compound for a catalyst for olefin polymerization and to a catalyst for olefin polymerization comprising the same. Specifically, the present invention relates to a transition metal compound for an olefin polymerization catalyst in which an allyltrimethylsilane substituent is introduced into the cyclopentadienyl group and to a catalyst for olefin polymerization comprising the same.

12 Claims, No Drawings

TRANSITION METAL COMPOUND FOR A CATALYST FOR OLEFIN POLYMERIZATION AND CATALYST FOR OLEFIN POLYMERIZATION COMPRISING THE SAME

CROSS-REFERENCE TO RELATED APPLICATIONS

This application is a National Stage of International Application No. PCT/KR2019/015217 filed Nov. 11, 2019, claiming priority based on Korean Patent Application No. 10-2018-0143289 filed Nov. 20, 2018.

TECHNICAL FIELD

The present invention relates to a transition metal compound for a catalyst for olefin polymerization and to a catalyst for olefin polymerization comprising the same. Specifically, the present invention relates to a transition metal compound for a catalyst for olefin polymerization in which an allyltrimethylsilane substituent is introduced into the cyclopentadienyl group and to a catalyst for olefin polymerization comprising the same.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution, a uniform distribution of comonomers, and a higher copolymerization activity than Ziegler-Natta catalysts.

However, there is still a need for a metallocene catalyst for olefin polymerization that has high activity and enhanced copolymerizability and is capable of preparing a resin having a high molecular weight.

DETAILED DESCRIPTION OF THE INVENTION

Technical Problem

An object of the present invention is to provide a transition metal compound for a catalyst for olefin polymerization having high activity and a novel structure, which is capable of producing a resin having excellent physical properties, and a metallocene catalyst for olefin polymerization comprising the same.

Technical Solution

According to an embodiment of the present invention for achieving the object, there is provided a transition metal compound represented by Formula A.

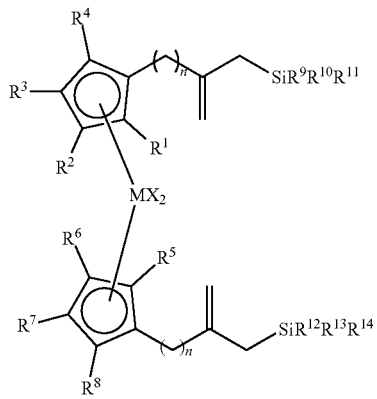

[Formula 1]

In Formula 1, n is each independently an integer of 1 to 20,

M is titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, $R^1$ to $R^4$ and $R^5$ to $R^8$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, and $R^9$ to $R^{11}$ and $R^{12}$ to $R^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R^1$ to $R^4$ and $R^5$ to $R^8$ are each independently capable of being linked to adjacent groups to form a substituted or unsubstituted saturated or unsaturated $C_{4-20}$ ring.

Specifically, in Formula 1, n is each 1 or 2, M is zirconium or hafnium, X is each halogen or substituted or unsubstituted $C_{1-20}$ alkyl, $R^1$ to $R^4$ and $R^5$ to $R^8$ are each hydrogen, and $R^9$ to $R^{11}$ and $R^{12}$ to $R^{14}$ are each substituted or unsubstituted $C_{1-20}$ alkyl or substituted or unsubstituted $C_{6-20}$ aryl.

Preferably, the compound represented by Formula 1 may be any one of the compounds represented by Formulae 1-1 and 1-8.

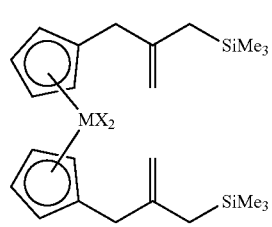

[Formula 1-1]

-continued

[Formula 1-2]

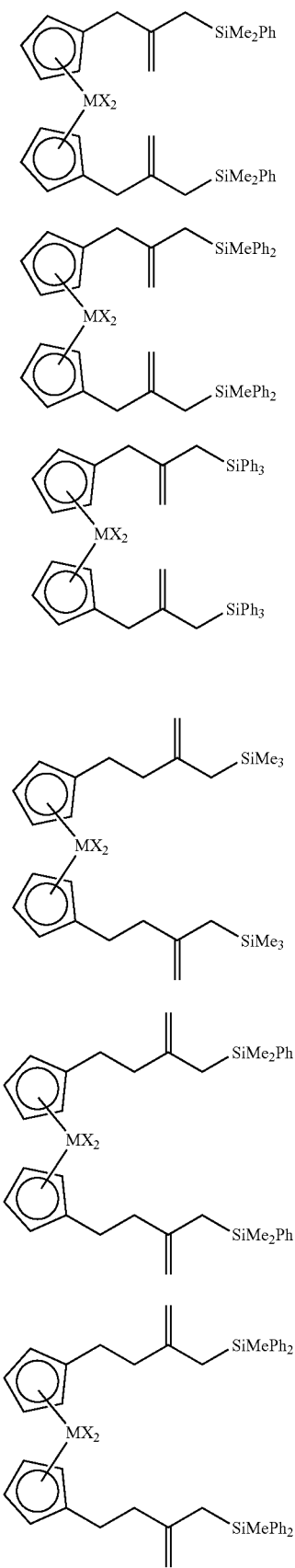

[Formula 1-3]

[Formula 1-4]

[Formula 1-5]

[Formula 1-6]

[Formula 1-7]

-continued

[Formula 1-8]

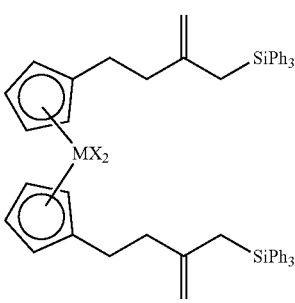

In Formulae 1-1 to 1-8, M is zirconium or hafnium, X is each halogen or substituted or unsubstituted $C_{1-20}$ alkyl, Me is a methyl group, and Ph is a phenyl group.

More preferably, the compound represented by Formula 1 may be any one of the compounds represented by Formulae 1-9 to 1-11.

[Formula 1-9]

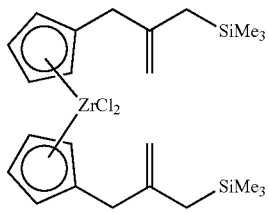

[Formula 1-10]

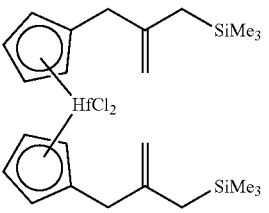

[Formula 1-11]

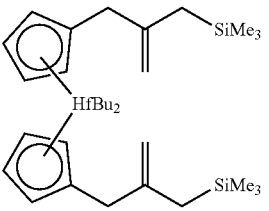

According to another embodiment of the present invention, there is provided a catalyst for olefin polymerization, which comprises the transition metal compound; and a cocatalyst compound.

Specifically, the cocatalyst compound may be at least one selected from the group consisting of a compound represented by Formula 2, a compound represented by Formula 3, and a compound represented by Formula 4.

[Formula 2]

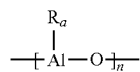

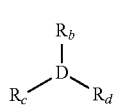

[Formula 3]

[L—H]⁺[Z(A)₄]⁻ or [L]⁺[Z(A)₄]⁻     [Formula 4]

In Formula 2, n is an integer of 2 or more, and $R_a$ may each independently be a halogen atom, $C_{1-20}$ hydrocarbon, or $C_{1-20}$ hydrocarbon substituted with halogen, in Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 4, L is a neutral or cationic Lewis acid, [L-H]⁺ and [L]⁺ a Brönsted acid, Z is a group 13 element, and A is each independently substituted or unsubstituted $C_{6-20}$ aryl or substituted or unsubstituted $C_{1-20}$ alkyl.

Specifically, the compound represented by Formula 2 is at least one selected from the group consisting of methylaluminoxane, ethylaluminoxane, isobutylaluminoxane, and butylaluminoxane.

In addition, the compound represented by Formula 3 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexylaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 4 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

Preferably, the catalyst for olefin polymerization further comprises a carrier for supporting the transition metal compound. Specifically, the carrier may support both of the transition metal compound and the cocatalyst.

Specifically, the carrier may comprise at least one selected from the group consisting of silica, alumina, and magnesia.

Here, the amount of the transition metal compound supported on the carrier is 0.001 to 1 mmole based on 1 g of the carrier, and the amount of the cocatalyst compound supported on the carrier is 2 to 15 mmoles based on the 1 g of the carrier.

Advantageous Effects of the Invention

Since the transition metal compound for a catalyst for olefin polymerization and the metallocene catalyst for olefin polymerization comprising the same according to an embodiment of the present invention has a unique three-dimensional structure, it is possible to control the physical properties of a polymer.

BEST MODE FOR CARRYING OUT THE INVENTION

Hereinafter, the present invention will be described in more detail.

Transition Metal Compound for a Catalyst for Olefin Polymerization

According to an embodiment of the present invention, there is provided a transition metal compound represented by Formula A.

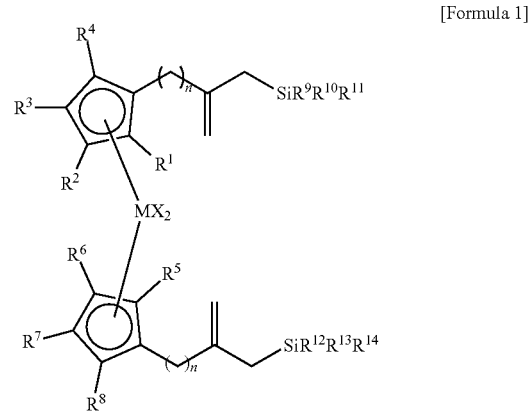

[Formula 1]

In Formula 1, n is each independently an integer of 1 to 20, preferably an integer of 1 to 10, more preferably an integer of 1 to 5. Specifically, n may each be 1 or 2.

M is titanium (Ti), zirconium (Zr), or hafnium (Hf). Specifically, M may be zirconium or hafnium.

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene. Specifically, X may each be halogen or substituted or unsubstituted $C_{1-20}$ alkyl. More specifically, X may each be chlorine or a butyl group.

$R^1$ to $R^4$ and $R^5$ to $R^8$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl. In addition, $R^1$ to $R^4$ and $R^5$ to $R^8$ are each independently capable of being linked to adjacent groups to form a substituted or unsubstituted saturated or unsaturated $C_420$ ring. Specifically, $R^1$ to $R^4$ and $R^5$ to $R^8$ may each be hydrogen.

$R^9$ to $R^{11}$ and $R^{12}$ to $R^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ Silyl.

Specifically, $R^9$ to $R^{11}$ and $R^{12}$ to $R^{14}$ may each be substituted or unsubstituted $C_{1-20}$ alkyl or substituted or unsubstituted $C_{6-20}$ aryl. More specifically, $R^9$ to $R^{11}$ and $R^{12}$ to $R^{14}$ may each be a methyl group or a phenyl group.

In a preferred embodiment of the present invention, the compound represented by Formula 1 may be any one of the compounds represented by Formulae 1-1 to 1-8.

[Formula 1-1]
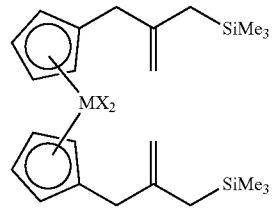

[Formula 1-2]
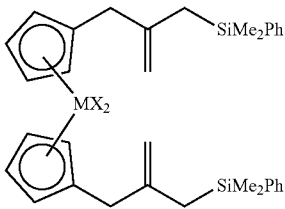

[Formula 1-3]
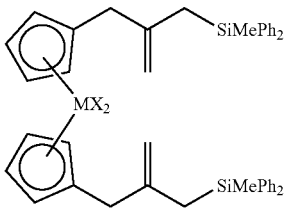

[Formula 1-4]
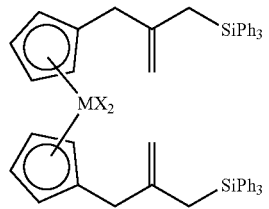

[Formula 1-5]
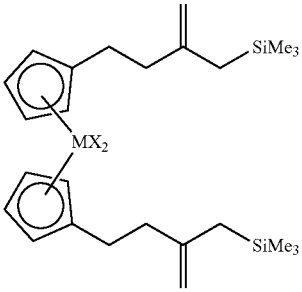

[Formula 1-6]
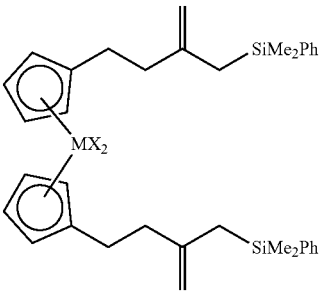

[Formula 1-7]
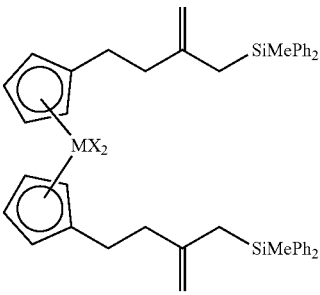

[Formula 1-8]
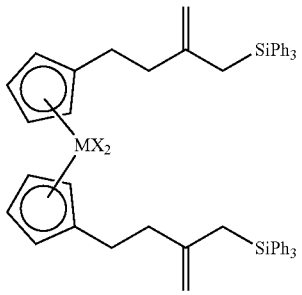

In Formulae 1-1 to 1-8 above, M is zirconium or hafnium, X is each halogen or substituted or unsubstituted $C_{1-20}$ alkyl, preferably chlorine or a butyl group, Me is a methyl group, and Ph is a phenyl group.

In a more preferred embodiment of the present invention, the compound represented by Formula 1 may be any one of the compounds represented by Formulae 1-9 to 1-11.

[Formula 1-9]

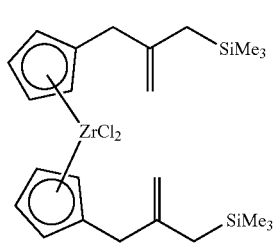

[Formula 1-1]

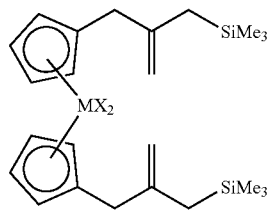

[Formula 1-10]

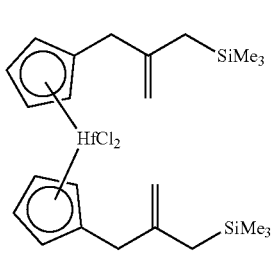

[Formula 1-2]

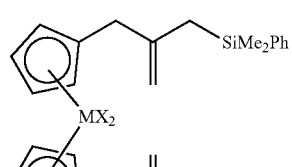

[Formula 1-3]

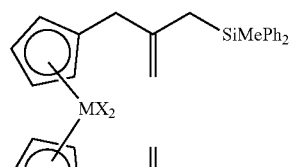

[Formula 1-11]

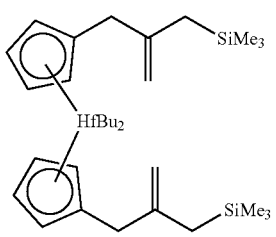

[Formula 1-4]

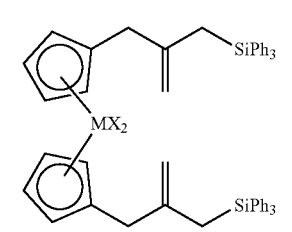

Catalyst for Olefin Polymerization

According to another embodiment of the present invention, there is provided a catalyst for olefin polymerization, which comprises a transition metal compound represented by Formula 1; and a cocatalyst compound.

[Formula 1-5]

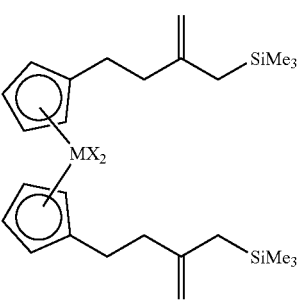

[Formula 1]

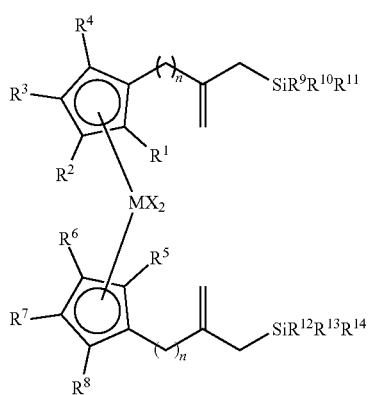

[Formula 1-6]

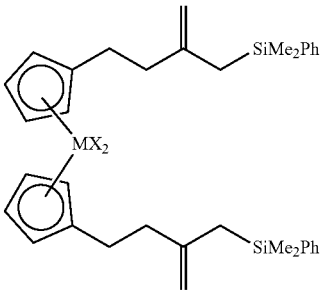

In Formula 1, n, M, X, $R^1$ to $R^4$ and $R^5$ to $R^8$, and $R^9$ to $R^{11}$ and $R^{12}$ to $R^{14}$ are as described above in the section of the transition metal compound.

In a preferred embodiment of the present invention, the compound represented by Formula 1 may be any one of the compounds represented by Formulae 1-1 to 1-8.

-continued

[Formula 1-7]

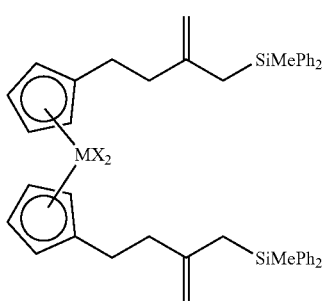

[Formula 1-8]

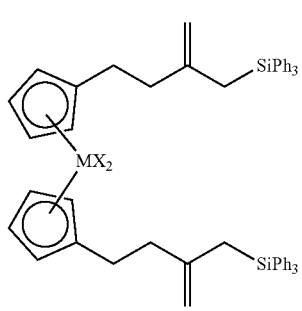

In Formulae 1-1 to 1-8, M, X, Me, and Ph are as described above in the section of the transition metal compound.

In a more preferred embodiment of the present invention, the compound represented by Formula 1 may be any one of the compounds represented by Formulae 1-9 to 1-11.

[Formula 1-9]

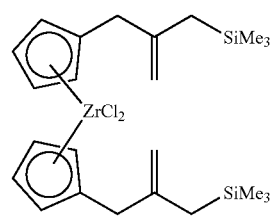

[Formula 1-10]

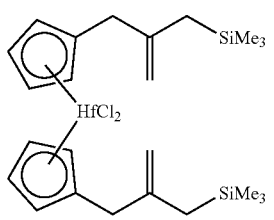

[Formula 1-11]

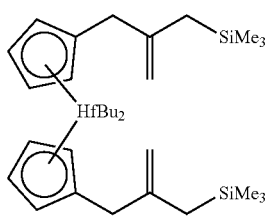

Meanwhile, the cocatalyst compound may comprise at least one of a compound represented by Formula 2, a compound represented by Formula 3, and a compound represented by Formula 4.

[Formula 2]

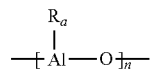

In Formula 2, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

[Formula 3]

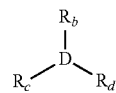

In Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$$[L-H]^+[Z(A)_4]^- \text{ or } [L]^+[Z(A)_4]^-$$ [Formula 4]

In Formula 4, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Specifically, examples of the compound represented by Formula 2 include methylaluminoxane, ethylaluminoxane, isobutylaluminoxane, butylaluminoxane, and the like. Preferred is methylaluminoxane. But it is not limited thereto.

Examples of the compound represented by Formula 3 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 4 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra (o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

In a preferred embodiment of the present invention, the catalyst for olefin polymerization may further comprise a carrier for supporting the first transition metal compound. Specifically, the carrier may support both of the transition metal compound and the cocatalyst.

In such an event, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the transition metal compounds and the cocatalyst compound.

As a method of supporting the transition metal compounds and the cocatalyst compound employed in a catalyst for olefin polymerization on the carrier, a physical adsorption method or a chemical adsorption method may be used.

For example, the physical adsorption method may be a method of contacting a solution in which a transition metal compound has been dissolved with a carrier and then drying the same; a method of contacting a solution in which a transition metal compound and a cocatalyst compound have been dissolved with a carrier and then drying the same; or a method of contacting a solution in which a transition metal compound has been dissolved with a carrier and then drying the same to prepare the carrier that supports the transition metal compound, separately contacting a solution in which a cocatalyst compound has been dissolved with a carrier and then drying the same to prepare the carrier that supports the cocatalyst compound, and then mixing them.

The chemical adsorption method may be a method of supporting a cocatalyst compound on the surface of a carrier, and then supporting a transition metal compound on the cocatalyst compound; or a method of covalently bonding a functional group on the surface of a carrier (e.g., a hydroxy group (—OH) on the silica surface in the case of silica) with a catalyst compound.

The amount of the transition metal compound supported on a carrier may be 0.001 to 1 mmole based on 1 g of the carrier. When the content ratio of the transition metal compounds and the carrier satisfies the above range, an appropriate activity of the supported catalyst may be exhibited, which is advantageous from the viewpoint of maintaining the activity of the catalyst and economical efficiency.

The amount of the cocatalyst compound supported on a carrier may be 2 to 15 mmoles based on the 1 g of the carrier. When the content ratio of the cocatalyst compound and the carrier satisfies the above range, it is advantageous from the viewpoint of maintaining the activity of the catalyst and economical efficiency.

One or two or more types of a carrier may be used. For example, both the transition metal compound and the cocatalyst compound may be supported on one type of a carrier, or the transition metal compound and the cocatalyst compound may be supported on two or more types of a carrier, respectively. In addition, either one of the transition metal compound and the cocatalyst compound may be supported on a carrier.

Polymerization of Olefin

An olefinic monomer may be polymerized in the presence of the catalyst for olefin polymerization according to an embodiment of the present invention to prepared a polyolefin.

Here, the polyolefin may be a homopolymer of an olefinic monomer or a copolymer of an olefinic monomer and an olefinic comonomer.

The olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and a $C_{3-20}$ alpha-olefin are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

Embodiments for Carrying Out the Invention

Example

Hereinafter, the present invention will be described in detail with reference to Examples, However, the following examples are intended to further illustrate the present invention. The scope of the present invention is not limited thereto only.

Preparation Example 1: Preparation of Bis[(2-trimethylsilylmethylallyl)cyclopentadienyl] Zirconium Dichloride (Formula 1-9)

Preparation of 2-(trimethylsilylmethyl)-2-propen-1-ol

An aqueous solution of potassium carbonate ($K_2CO_3$) (6.6 M, 14.4 mmoles) was slowly added to a solution of 2-(trimethylsilylmethyl)allyl acetate (2.69 g, 14.4 mmoles) in methanol (22 ml). Upon completion of the addition, it was stirred at room temperature for 4 hours. After stirring, water was added thereto to terminate the reaction. The organic layer was extracted with diethyl ether, and residual water was removed using magnesium sulfate ($MgSO_4$). All solvents were removed under vacuum to obtain 1.51 g (72%) of a pale beige oily compound.

$^1$H-NMR (CDCl$_3$, 300 MHz): δ 4.90-4.88 (m, 1H), 4.66 (s, 1H), 3.97 (s, 2H), 1.53 (s, 2H), 0.03 (s, 9H).

Preparation of 2-(trimethylsilylmethyl) Methanesulfonate

Methanesulfonyl chloride (1.8 g, 15.7 mmoles) was slowly added at 0° C. to a solution in which 2-(trimethylsilylmethyl)-2-propen-1-ol (1.51 g, 10.5 mmoles) and triethylamine (1.91 g, 18.8 mmoles) had been diluted in dichloromethane (30 ml). Thereafter, it was stirred at 0° C. for 3 hours. An aqueous solution of sodium hydrogen carbonate (NaHCO$_3$) was added thereto at 0° C. to terminate the reaction, and the organic layer was then extracted with dichloromethane. Residual water was removed using sodium sulfate (Na$_2$SO$_4$), and all solvents were removed under vacuum to obtain 1.9 g (82%) of a yellow oily compound.

$^1$H-NMR (CDCl$_3$, 300 MHz): δ 5.03 (d, 1H), 4.84 (s, 1H), 4.56 (s, 2H), 3.02 (s, 3H), 1.60 (s, 2H), 0.06 (s, 9H).

Preparation of 2-(trimethylsilylmethyl)allyl Bromide

A solution of lithium bromide dispersed in tetrahydrofuran (15 ml) was slowly added at room temperature to a solution in which 2-(trimethylsilylmethyl) methanesulfonate (1.9 g, 8.54 mmoles) had been diluted in tetrahydrofuran (20 ml). It was then stirred at 110° C. for 4 hours. Distilled water was added thereto at 0° C. to terminate the reaction, and the organic layer was then extracted with diethyl ether. Residual water was removed using sodium sulfate, and all solvents were removed under vacuum to obtain 1.12 g (65%) of a yellow oily compound.

$^1$H-NMR (CDCl$_3$, 300 MHz): δ 5.04 (s, 1H), 4.74 (d, 1H), 3.90 (d, 2H), 1.72 (d, 2H), 0.05 (s, 9H).

Preparation of [2-(cyclopentadienylmethyl)allyl] trimethylsilane

Sodium cyclopentadienide (3.04 g, 6.49 mmoles, 2M in THF) was slowly added dropwise at −30° C. to a solution in which 2-(trimethylsilylmethyl)allyl bromide (1.12 g, 5.41 mmoles) had been diluted in tetrahydrofuran (20 ml), and the temperature was slowly raised to room temperature, followed by stirring thereof for 12 hours. Distilled water was added thereto at 0° C. to terminate the reaction, and the organic layer was then extracted with diethyl ether. Residual water was removed using magnesium sulfate, and it was subjected to separation by column chromatography (hexane) to obtain 620 mg (60%) of a pale beige oily compound.

$^1$H-NMR (CDCl$_3$, 300 MHz): δ 6.42-6.02 (m, 4H), 4.60-4.55 (m, 2H), 3.06-2.97 (m, 2H), 2.87-2.85 (m, 2H), 1.54 (s, 2H), 0.03 (d, 9H).

Preparation of [2-(trimethylsilylmethyl)allyl] cyclopentadienyl Lithium

N-butyllithium (n-BuLi) (1.44 g, 2.93 mmoles, 1.6 M hexane solution) was slowly added at −30° C. to a solution in which [2-(cyclopentadienylmethyl)allyl] trimethylsilane (620 mg, 3.22 mmoles) had been diluted in tetrahydrofuran (10 ml), and the temperature was slowly raised to room temperature, followed by stirring thereof for 12 hours. The solvents in the reaction solution were removed under vacuum, hexane was added thereto, followed by stirring thereof for 15 minutes. The resulting solid was filtered and dried under vacuum to obtain 528 mg (83%) of a pale yellow solid compound.

Preparation of bis[(2-trimethylsilylmethylallyl)cyclopentadienyl] Zirconium Dichloride A solution of zirconium chloride (ZrCl$_4$) (147 mg, 0.63 mmole) dispersed in tetrahydrofuran (2 ml) was slowly added at −30° C. to a solution in which [2-(trimethylsilylmethyl)allyl] cyclopentadienyl lithium (250 mg, 1.26 mmoles) had been diluted in toluene (3 ml), and the temperature was slowly raised to room temperature, followed by stirring thereof for 12 hours. Upon completion of the reaction, the reaction solution was filtered, and the solvent of the filtrate was dried under vacuum. The resulting solid was washed with hexane and dried to obtain 107 mg (31%) of a pale beige solid compound.

$^1$H-NMR (CDCl$_3$, 300 MHz): δ 6.31 (t, 2H), 6.22 (t, 2H), 4.55 (s, 1H), 4.44 (s, 1H), 3.26 (s, 2H), 1.52 (s, 2H), 0.05 (s, 9H).

Preparation Example 2: Preparation of Bis[(2-trimethylsilylmethylallyl)cyclopentadienyl] Hafnium Dichloride (Formula 1-10)

A solution of hafnium chloride (HfCl$_4$) (226 mg, 0.71 mmole) dispersed in toluene (2 ml) was slowly added at −30° C. to a solution in which [2-(trimethylsilylmethyl)allyl]cyclopentadienyl lithium (280 mg, 1.41 mmoles) prepared in the same manner as in Preparation Example 1 had been diluted in toluene (3 ml), and the temperature was slowly raised to room temperature, followed by stirring thereof for 12 hours. Upon completion of the reaction, the reaction solution was filtered, and the solvent of the filtrate was dried under vacuum. The resulting solid was washed with hexane and dried to obtain 180 mg (41%) of a white solid compound.

$^1$H-NMR (CDCl$_3$, 300 MHz): δ 6.21 (t, 2H), 6.12 (t, 2H), 4.54 (d, 2H), 4.44 (d, 1H), 3.28 (s, 2H), 1.52 (s, 2H), 0.05 (s, 9H).

Preparation Example 3: Preparation of Bis[(2-trimethylsilylmethylallyl)cyclopentadienyl] Hafnium Dibutyl (Formula 1-11)

N-butyllithium (55 mg, 0.13 mmole) was slowly added at −30° C. to a solution in which bis[(2-trimethylsilylmethylallyl)cyclopentadienyl] hafnium dichloride (40 mg, 0.06 mmole) prepared in the same manner as in Preparation Example 2 had been diluted in toluene (1 ml), and the temperature was slowly raised to room temperature, followed by stirring thereof for 12 hours. Upon completion of the reaction, the reaction solution was filtered, and the solvent of the filtrate was dried under vacuum to obtain 34 mg (80%) of a yellow liquid compound.

$^1$H-NMR (CDCl$_3$, 300 MHz): δ 5.83 (t, 2H), 5.78 (t, 2H), 4.55 (d, 2H), 3.03 (s, 1H), 2.35 (s, 2H), 1.56 (s, 2H), 1.27-1.26 (m, 2H), 1.13-1.06 (m, 2H), 0.81 (t, 3H), 0.05 (s, 9H).

INDUSTRIAL APPLICABILITY

According to the embodiment of the present invention, there are provided a transition metal compound for a catalyst for olefin polymerization having high activity and a novel structure, which is capable of producing a resin having excellent physical properties, and a metallocene catalyst for olefin polymerization comprising the same.

The invention claimed is:

1. A transition metal compound represented by Formula 1:

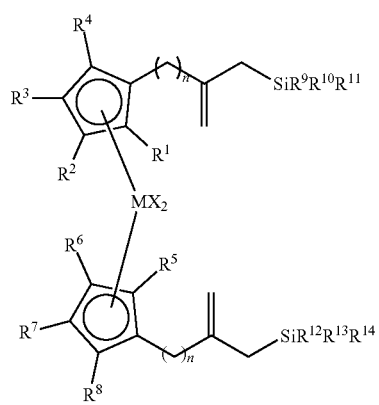

[Formula 1]

in Formula 1, n is each independently an integer of 1 to 20,

M is titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, R$^1$ to R$^4$ and R$^5$ to R$^8$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, and R$^9$ to R$^{11}$ and R$^{12}$ to R$^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein R$^1$ to R$^4$ and R$^5$ to R$^8$ are each independently optionally linked to adjacent groups to form a substituted or unsubstituted saturated or unsaturated $C_{4-20}$ ring.

2. The transition metal compound of claim 1, wherein, in Formula 1, n is each 1 or 2, M is zirconium or hafnium, X is each halogen or substituted or unsubstituted $C_{1-20}$ alkyl, R$^1$ to R$^4$ and R$^5$ to R$^8$ are each hydrogen, and R$^9$ to R$^{11}$ and R$^{12}$ to R$^{14}$ are each substituted or unsubstituted $C_{1-20}$ alkyl or substituted or unsubstituted $C_{6-20}$ aryl.

3. The transition metal compound of claim 1, wherein the compound represented by Formula 1 is any one of the compounds represented by Formulae 1-1 to 1-8:

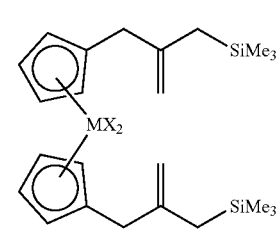

[Formula 1-1]

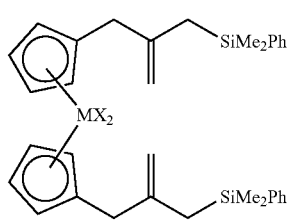

[Formula 1-2]

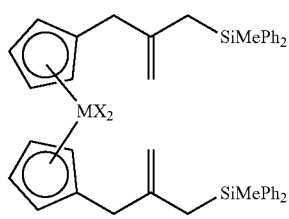

[Formula 1-3]

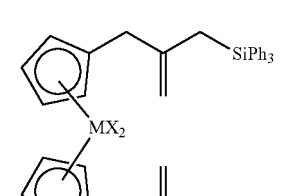

[Formula 1-4]

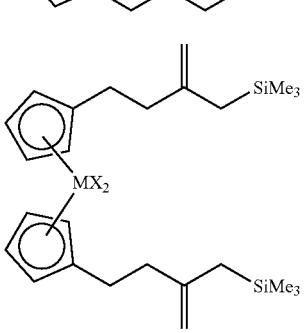

[Formula 1-5]

[Formula 1-6]

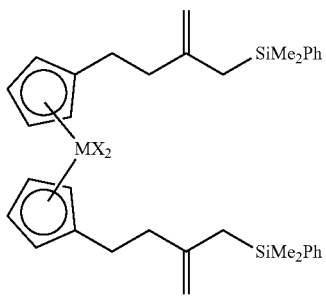

[Formula 1-7]

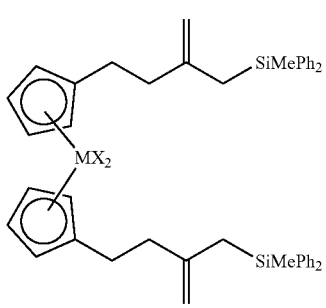

[Formula 1-8]

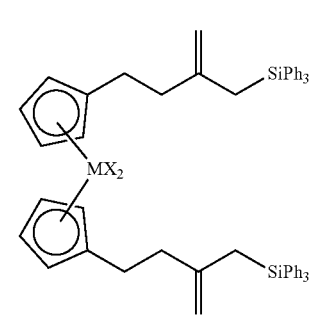

in Formulae 1-1 to 1-8 above, M is zirconium or hafnium, X is each halogen or substituted or unsubstituted $C_{1-20}$ alkyl, Me is a methyl group, and Ph is a phenyl group.

4. The transition metal compound of claim 1, wherein the compound represented by Formula 1 is any one of the compounds represented by Formulae 1-9 to 1-11:

[Formula 1-9]

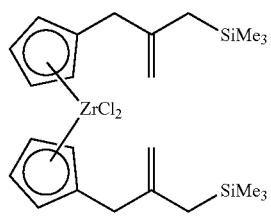

[Formula 1-10]

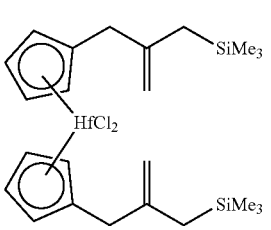

[Formula 1-11]

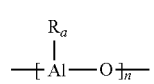

in Formulae 1-9 to 1-11 above, Me is a methyl group, and Bu is a butyl group.

5. A catalyst for olefin polymerization, which comprises the transition metal compound of claim 1 and a cocatalyst compound.

6. The catalyst for olefin polymerization of claim 5, wherein the cocatalyst compound is at least one selected from the group consisting of a compound represented by Formula 2, a compound represented by Formula 3, and a compound represented by Formula 4:

[Formula 2]

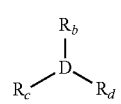

[Formula 3]

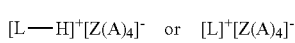

[Formula 4]

$[L-H]^+[Z(A)_4]^-$ or $[L]^+[Z(A)_4]^-$ in Formula 2, n is an integer of 2 or more, and $R_a$ may each independently be a halogen atom, $C_{1-20}$ hydrocarbon, or $C_{1-20}$ hydrocarbon substituted with halogen, in Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 4, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

7. The catalyst for olefin polymerization of claim 6, wherein the compound represented by Formula 2 is at least one selected from the group consisting of methylaluminoxane, ethylaluminoxane, isobutylaluminoxane, and butylaluminoxane.

8. The catalyst for olefin polymerization of claim 6, wherein the compound represented by Formula 3 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

9. The catalyst for olefin polymerization of claim 6, wherein the compound represented by Formula 4 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

10. The catalyst for olefin polymerization of claim 5, which further comprises a carrier for supporting the transition metal compound, the cocatalyst compound, or both.

11. The catalyst for olefin polymerization of claim 10, wherein the carrier comprises at least one selected from the group consisting of silica, alumina, and magnesia.

12. The catalyst for olefin polymerization of claim 10, wherein the amount of the transition metal compound supported on the carrier is 0.001 to 1 mmole based on 1 g of the carrier, and the amount of the cocatalyst compound supported on the carrier is 2 to 15 mmoles based on the 1 g of the carrier.

\* \* \* \* \*